US010852549B2

(12) United States Patent
Rousseau et al.

(10) Patent No.: US 10,852,549 B2
(45) Date of Patent: Dec. 1, 2020

(54) METHOD OF DETERMINING A CORRECTING OPTICAL FUNCTION TO A VIRTUAL IMAGE

(71) Applicant: Essilor International, Charenton-le-Pont (FR)

(72) Inventors: Denis Rousseau, Charenton-le-Pont (FR); Benoit Callier, Charenton-le-Pont (FR); Marion Swital, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 16/330,221

(22) PCT Filed: Sep. 12, 2017

(86) PCT No.: PCT/EP2017/072812
§ 371 (c)(1),
(2) Date: Mar. 4, 2019

(87) PCT Pub. No.: WO2018/050611
PCT Pub. Date: Mar. 22, 2018

(65) Prior Publication Data
US 2019/0227326 A1      Jul. 25, 2019

(30) Foreign Application Priority Data
Sep. 19, 2016    (EP) ..................... 16306192

(51) Int. Cl.
*G02B 27/01*    (2006.01)
*G02C 7/06*     (2006.01)
*G02C 7/08*     (2006.01)

(52) U.S. Cl.
CPC ..... *G02B 27/0172* (2013.01); *G02B 27/0179* (2013.01); *G02C 7/061* (2013.01);
(Continued)

(58) Field of Classification Search
CPC ............ G02B 27/0172; G02B 27/0179; G02B 2027/011; G02B 2027/014;
(Continued)

(56) References Cited

U.S. PATENT DOCUMENTS

| | | | |
|---|---|---|---|
| 2010/0091027 A1 | 4/2010 | Oyama et al. | |
| 2014/0327604 A1* | 11/2014 | Oyama | G02B 27/0068 345/8 |
| 2017/0299891 A1* | 10/2017 | Odaira | G02C 7/06 |

OTHER PUBLICATIONS

International Search Report dated Nov. 17, 2017 in PCT/EP2017/072812 filed Sep. 12, 2017.

* cited by examiner

*Primary Examiner* — Chanh D Nguyen
*Assistant Examiner* — Ngan T. Pham-Lu
(74) *Attorney, Agent, or Firm* — Oblon, McClelland, Maier & Neustadt, L.L.P.

(57) ABSTRACT

A method implemented by computer device of determining a correcting optical function to be applied on a virtual image to be displayed to a user of an optical system including an optical lens to be placed in front of a user eye and including a back face having an optical design; a see-through displaying device configured to display the virtual image towards the eye, the virtual image being transmitted at least through the back face of the optical lens defining a display area on the back face; the method includes a step, during which optical design data relating to the optical design of the back face of the optical lens are provided; a display area data providing step, during which display area data relative to at least one parameter of the display area are provided; and a correcting optical function determining step, during which a correcting optical function is determined based at least on the optical design data and on the display area data.

18 Claims, 1 Drawing Sheet

(52) U.S. Cl.
CPC .. *G02B 2027/011* (2013.01); *G02B 2027/014* (2013.01); *G02B 2027/0178* (2013.01); *G02B 2027/0185* (2013.01); *G02C 7/086* (2013.01)

(58) Field of Classification Search
CPC .... G02B 2027/0178; G02B 2027/0185; G02C 7/061; G02C 7/086
USPC .......................................................... 345/8
See application file for complete search history.

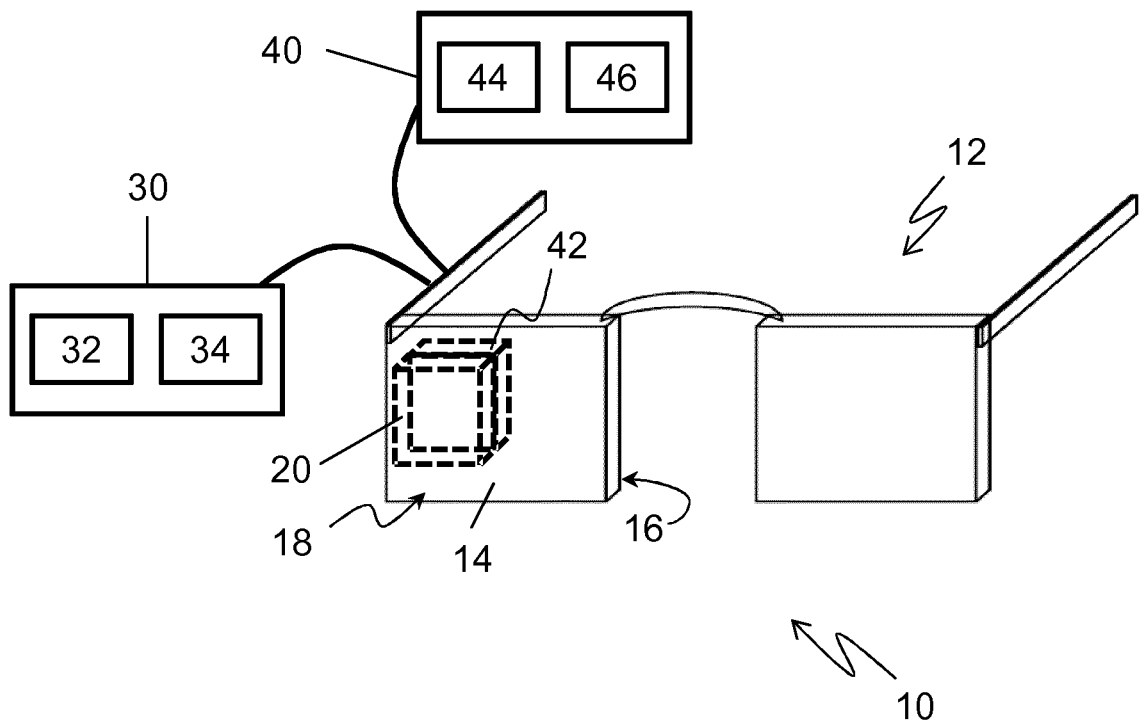
Figure 1
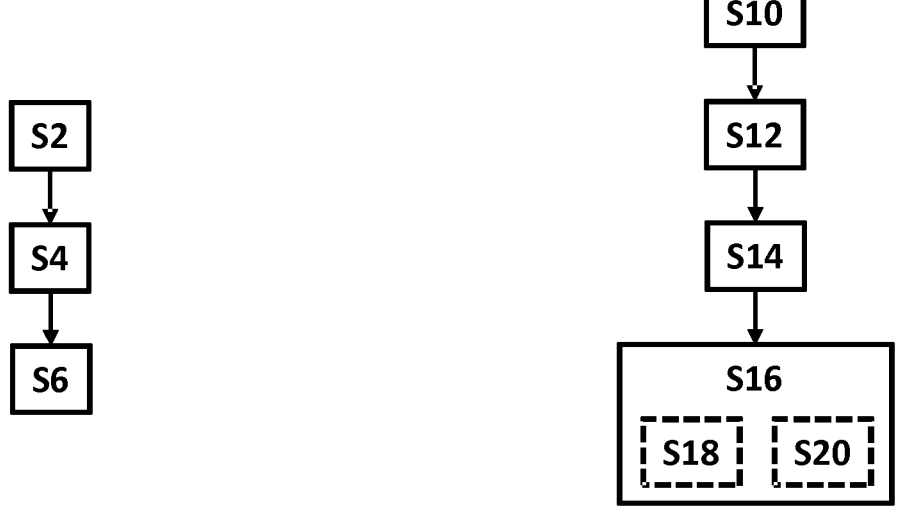
Figure 2
Figure 3

METHOD OF DETERMINING A CORRECTING OPTICAL FUNCTION TO A VIRTUAL IMAGE

FIELD OF THE INVENTION

The invention relates to a correcting method and corresponding component for determining a correcting optical function to be applied on a virtual image to be displayed to a user of an optical system. The invention further refers to an optical system adapted to a user and a head mounted device configured to be worn by a user comprising such component.

BACKGROUND OF THE INVENTION

A head-mounted system (HMD) is an electro-optical device worn on the head by a wearer. Usually such system is electronically controlled so as to switch between different stages or to display information to the wearer. A head mounted system usually presents like a spectacle frame with electronically controlled spectacle lenses.

The present invention is concerned with head-mounted system used according to various usage pattern such as non-immersive head-mounted system that allow the wearer to interact with their environment while using the head-mounted system or immersive head-mounted system that cuts off the field of outside view.

More particularly, the present invention is concerned with head-mounted system comprising a see-around or see-through mechanism.

Head-mounted see-through display systems are capable of superimposing information, for example computer generated information, over the real-world view. Such head-mounted see-through display systems are used in particular for realizing augmented reality.

There is a need to provide an optical device adapted to a wearer or a group of wearers, in particular adapted to their lifestyle, their visual needs and/or their requests in a simply manner, with a modular approach if necessary and preferably in a late step of the manufacturing of the optical device in order to limit the unit production cost.

In the example of a head mounted display systems, there is a need to customize such system to the wearer's viewing ability since, the wearer sees the real-world through it. If the wearer needs corrective ophthalmic lenses to see the real world correctly, the head mounted see-through system should be adapted to such requirements.

Therefore, there is a need to provide an optical device, for example a head-mounted see-through system, adapted to a wearer or a group of wearers and in particular to a wearer's prescription.

The wearer's prescription is a set of optical characteristics of optical power, of astigmatism and, where relevant, of addition, determined by an ophthalmologist or an optometrist in order to correct the vision defects of the wearer, for example by means of a lens positioned in front of his eye. For example, the prescription for a progressive addition lens comprises values of optical power and of astigmatism at the distance-vision point and, where appropriate, an addition value.

Therefore, it is an object of the present invention to provide an optical device comprising a displaying device adapted to a wearer visual needs, whether it is wearer's prescription or other visual needs such a light attenuation, color perception, glare protection, visual comfort improvement.

SUMMARY OF THE INVENTION

To this end, the invention proposes a method implemented by computer means of determining a correcting optical function to be applied on a virtual image to be displayed to a user of an optical system comprising at least:
- an optical lens designed to be placed in front of an eye of the user and comprising at least a back face having an optical design;
- a see-through displaying device designed and configured to display the virtual image towards the eye of the user, the virtual image being transmitted at least through the back face of the optical lens defining a display area on the back face;

the method comprises:
- an optical design data providing step, during which optical design data relating to the optical design of the back face of the optical lens is provided;
- a display area data providing step, during which display area data relative to at least one parameter of the display area are provided; and
- a correcting optical function determining step, during which a correcting optical function is determined based at least on the optical design data and on the display area data.

Advantageously, the method of determining a correcting optical function to be applied on a virtual image according to the invention allows providing an optical system adapted to a user and wherein the use and the virtual comfort of the virtual image is optimized for the user.

Thanks to the invention, the consideration of a possible visual correction by the optical lens provides a uniform rendering of a virtual information to be displayed during use of the optical system. Aberrations generated by such an optical lens is even more visible on the lenses having a high power or variable power depending on zones on the lens, for example the progressive or multifocal lenses.

According to an embodiment, the optical lens further comprises a front face opposed to the back face and having another optical design and the virtual image is further transmitted through the front face of the optical lens. Furthermore, during the optical design data providing step, optical design data relating to the optical design of the front face of the optical lens is further provided and, the correcting optical function is further determined based on the optical design data relating to the optical design of the front face of the optical lens.

According to further embodiments which are compatible with the previous one and can be considered alone or in combination:
- the front and the back faces are designed and arranged so as to form an ophthalmic lens adapted to the user's prescription;
- the ophthalmic lens is a progressive optical lens and/or a multifocal optical lens;
- the at least one parameter of the display area comprises the relative position of the display area with respect to at least the back face and/or the relative angular extent of the display area with respect to at least the back face and/or the projection distance of the virtual image.

Another object of the invention relates to a method for providing an optical system adapted to a user, the optical system comprising at least an optical lens and a see-through displaying device, the method comprises at least:
- an optical lens providing step, during which the optical lens is provided, the optical lens being designed to be placed in front of an eye of the user and comprising at least a back face having an optical design;
- a see-through displaying device providing step; during which a see-through displaying device is provided, the see-through displaying device being designed and configured to display the virtual image towards the eye of the user, the virtual image being transmitted at least through the back face of the optical lens defining a display area on the back face;
- a correcting optical function determining step, during which a correcting optical function to be applied on a virtual image to be displayed to the user the optical system is determined according to the invention;
- an optical system adjusting step, during which the optical system is adjusted based on the determined correcting optical function.

According to further embodiments which are compatible with the previous one and can be considered alone or in combination:
- the optical system adjusting step comprises an optical device providing step, during which an optical device is provided, the optical device being designed to be placed such that the virtual image is further transmitted through the optical device and the optical device having an optical function based on the determined correcting optical function;
- the optical system adjusting step comprises a virtual source image processing step, during which a virtual source image from which the virtual image is displayed is processed based on the determined correcting optical function.

The invention also relates to a correction determining component for determining a correcting optical function to be applied on a virtual image to be displayed to a user of an optical system comprising at least:
- an optical lens designed to be placed in front of an eye of the user and comprising at least a back face having an optical design;
- a see-through displaying device designed and configured to display the virtual image towards the eye of the user, the virtual image being transmitted at least through the back face of the optical lens defining a display area on the back face;

the correction determining component comprising:
- a memory configured to store computer executable instructions, and
- a processor for executing the computer executable instructions stored in the memory, wherein the computer executable instructions comprises instructions for:
  - providing optical design data relating to the optical design of the back face of the optical lens,
  - providing display area data relative to at least one parameter of the display area, and
  - determining a correcting optical function based at least on the optical design data and on the display area data.

According to an embodiment, the optical lens further comprises a front face opposed to the back face and having another optical design and the virtual image is further transmitted through the front face of the optical lens; and the computer executable instructions further comprises one of the following instructions for:

- providing optical design data relating to the optical design of the front face of the optical lens, and
- determining the correcting optical function based on the optical design data relating to the optical design of the front face of the optical lens.

Another object of the invention relates to an optical system adapted to a user comprising:
- an optical lens designed to be placed in front of an eye of the user and comprising at least a back face having an optical design;
- a see-through displaying device designed and configured to display a virtual image towards the eye of the user, the virtual image being transmitted at least through the back face of the optical lens defining a display area on the back face;
- a correction determining component configured to determine a correcting optical function to be applied on a virtual image to be displayed to a user by the see-through displaying device according to the invention; and
- an optical system adjusting component configured to adjust the optical system based on the determined correcting optical function.

According to further embodiments which are compatible with the previous one and can be considered alone or in combination:
- the optical system adjusting component comprises an optical device designed to be placed such that the virtual image is further transmitted through the optical device and the optical device having an optical function based on the determined correcting optical function.
- the optical system adjusting component comprises:
  - a memory configured to store computer executable instructions, and
  - a processor for executing the computer executable instructions stored in the memory, wherein the computer executable instructions comprises instructions for processing a virtual source image from which the virtual image is displayed, based on the determined correcting optical function.

The invention also relates to a head mounted device configured to be worn by a user, comprising an optical device adapted to the user according to the invention.

The invention further relates to a computer program product comprising one or more stored sequences of instructions that are accessible to a processor and which, when executed by the processor, causes the processor to carry out at least the steps of the method according to the invention for determining a correcting optical function to be applied on a virtual image to be displayed to a user.

The invention also relates to a computer-readable storage medium having a program recorded thereon; where the program makes the computer execute at least the steps of the method according to the invention for determining a correcting optical function to be applied on a virtual image to be displayed to a user.

The invention further relates to a device comprising a processor adapted to store one or more sequence of instructions and to carry out at least the steps of one of the method according to the invention for determining a correcting optical function to be applied on a virtual image to be displayed to a user.

The invention further relates to a computer program product comprising one or more stored sequences of instructions that are accessible to a processor and which, when executed by the processor, causes the processor to carry out at least the steps of the method according to the invention for providing an optical system adapted to a user.

The invention also relates to a computer-readable storage medium having a program recorded thereon; where the program makes the computer execute at least the steps of the method according to the invention for providing an optical system adapted to a user.

The invention further relates to a device comprising a processor adapted to store one or more sequence of instructions and to carry out at least the steps of one of the method according to the invention for providing an optical system adapted to a user.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Other characteristics and advantages of the invention will become more apparent from the claims and from the following description of some embodiments given by way of example without limitation with reference to the drawings, in which:

FIG. 1 is a schematic representation of an embodiment of a head mounted device according to the invention, FIG. 2 is a general flow chart of an embodiment of the display managing method according to the invention, and FIG. 3 is a general flow chart of an embodiment of the method for providing an optical system adapted to a user according to the invention.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF PREFERRED EMBODIMENTS

As illustrated on FIG. 1, the invention relates to a head mounted device 10 configured to be worn by a user and comprising an optical system 12 adapted to the user.

The optical system 12 comprises at least an optical lens 14 designed to be placed in front of an eye of the user. The optical lens 14 comprises at least a back face 16 having an optical design and a front face 18 opposed to the back face 16 and having another optical design.

The wording "optical design" is a widely used wording known from the man skilled in the art in ophthalmic domain to designate the set of parameters allowing to define a dioptric function of an ophthalmic lens; each ophthalmic lens designer has its own designs, particularly for progressive ophthalmic lenses. As for an example, a progressive ophthalmic lens "design" results of an optimization of a progressive surface so as to restore a presbyope's ability to see clearly at all distances but also to optimally respect all physiological visual functions such as foveal vision, extra-foveal vision, binocular vision and to minimize unwanted astigmatisms. For example, a progressive lens design comprises:

a power profile along the main gaze directions (meridian line) used by the lens wearer during day life activities,
distributions of powers (mean power, astigmatism, . . . ) on the sides of the lens, that is to say away from the main gaze direction.

These optical characteristics are part of the "designs" defined and calculated by ophthalmic lens designers and that are provided with the progressive lenses.

The dioptric function corresponds to the optical lens power (mean power, astigmatism etc. . . . ) as a function of the gaze direction and results of the combination of the optical designs of the front and the back faces of the optical lens.

More precisely, in the sense of the invention, the optical function corresponds to a function providing for each gaze direction the effect of the optical lens on the light ray passing through the optical lens and depending on the combination of the optical designs of the front and the back faces of the optical lens.

The optical function may comprise as dioptric function, light absorption, polarizing capability, reinforcement of contrast capacity, etc. . . .

Preferably, the front and the back faces are designed and arranged so as to form an ophthalmic lens adapted to the user's prescription. For example, the ophthalmic lens is a progressive optical lens and/or a multifocal optical lens.

The optical system 12 further comprises a see-through displaying device 20 designed and configured to display a virtual image towards the eye of the user. The virtual image is transmitted at least through the back face 16 of the optical lens 14 defining a display area on the back face 16.

For example, the see-through displaying device 20 comprises a display device comprising a display source (not illustrated), a collimating source (not illustrated) and a light conducting element (not illustrated). The light conducting element is configured to output a supplementary light through an exit face of said light conducting element towards an eye of the wearer. For example, the light conducting element can be a light-guide optical element (LOE).

Such display system allows a two-dimensional image source to be imaged to infinity or not and reflected towards the eye of the wearer.

More precisely, the optical see-through display device 20 allows the user to interact with its environment while displaying information to the user. The device displays an image of the environment of the user with augmented reality based on a source image.

Furthermore, the optical system 12 comprises a correction determining component 30 configured to determine a correcting optical function to be applied on a virtual image to be displayed to a user by the see-through displaying device 20.

The correction determining component 30 comprises a memory 32 configured to store computer executable instructions, and a processor 34 for executing the computer executable instructions stored in the memory 32.

The computer executable instructions comprise instructions for:
 providing optical design data relating to the optical design of the back face of the optical lens,
 providing display area data relative to at least one parameter of the display area, and
 determining a correcting optical function based at least on the optical design data and on the display area data.

Preferably, the computer executable instructions further comprise one of the following instructions for:
 providing optical design data relating to the optical design of the front face of the optical lens, and
 determining the correcting optical function based on the optical design data relating to the optical design of the front face of the optical lens.

The optical system 12 further comprises an optical system adjusting component 40 configured to adjust the optical system based on the determined correcting optical function.

According to a preferred embodiment, the optical system adjusting component 40 comprises an optical device 42 designed to be placed such that the virtual image is further transmitted through the optical device. The optical device 42 has an optical function based on the determined correcting optical function.

According to another preferred embodiment compatible with the previous one, the optical system adjusting component 40 comprises:
 a memory 44 configured to store computer executable instructions, and
 a processor 46 for executing the computer executable instructions stored in the memory 44.

The computer executable instructions comprise instructions for processing a virtual source image from which the virtual image is displayed, based on the determined correcting optical function.

A method according to the invention will now be tailed with reference to FIG. 2. The method is destined to be implemented by computer means and allows the determination of a correcting optical function to be applied on a virtual image to be displayed to a user of an optical system as described hereinbefore.

The method comprises:
 an optical design data providing step S2,
 a display area data providing step S4, and
 a correcting optical function determining step S6.

More precisely, during the optical design data providing step S2, optical design data relating to the optical design of the back face of the optical lens are provided.

Then, display area data relative to at least one parameter of the display area are provided during the display area data providing step S4.

Preferably, the parameter of the display area can be:
 the relative position of the display area with respect to at least the back face,
 the relative angular extent of the display area with respect to at least the back face,
 the projection distance of the virtual image.

Finally, the correcting optical function is determined based at least on the optical design data and on the display area data during the correcting optical function determining step S6.

According to an embodiment wherein the virtual image is further transmitted through the front face 18 of the optical lens 14, optical design data relating to the optical design of the front face of the optical lens is further provided during the optical design data providing step S2. Moreover, the correcting optical function is further determined based on the optical design data relating to the optical design of the front face of the optical lens.

With reference to FIG. 3, the invention further relates to a method for providing an optical system 12 adapted to a user as described hereinbefore. The method comprises at least:
 an optical lens providing step S10,
 a see-through displaying device providing step S12;
 a correcting optical function determining step S14, and
 an optical system adjusting step S16.

During the optical lens providing step S10, the optical lens 14 is provided, the optical lens being already designed to be placed in front of an eye of the user.

Then, a see-through displaying device 20 is provided during the see-through displaying device providing step S12. The see-through displaying device 20 is designed and configured to display the virtual image towards the eye of the user such that the virtual image being transmitted at least through the back face 16 of the optical lens 14.

During the correcting optical function determining step S14, a correcting optical function to be applied on a virtual image to be displayed to the user the optical system 12 is determined according to the method described hereinbefore.

Then the optical system 12 is adjusted based on the determined correcting optical function during the optical system adjusting step S16.

According to an embodiment, the optical system adjusting step S16 further comprises an optical device providing step S18, during which an optical device 42 is provided. The optical device 42 is previously designed to be placed such that the virtual image is further transmitted through the optical device and the optical device 42 has an optical function based on the determined correcting optical function.

According to a second embodiment which can be compatible with the previous one, the optical system adjusting step S16 comprises a virtual source image processing step S20, during which a virtual source image from which the virtual image is displayed is processed based on the determined correcting optical function.

According to an embodiment compatible with the previous ones, the optical lens can be an active optical lens having a programmable optical function controlled by an optical function controller. Such active optical lens has the advantage to be more personalized to the wearer according to its viewing conditions and/or its activity.

In such embodiment, at least the optical design data relating to the optical design of the back face are provided over time during the optical design data providing step S2.

The correcting optical function is determined and thus updated based on the evolution over time of the optical design data during the correcting optical function determining step.

Thus, the optical function of the optical device can also be updated based on the updated correcting optical function during the optical device providing step S18 if the optical device is also an active optical lens having a programmable optical function.

Likewise, the processing of the virtual source image can be updated based on the updated correcting optical function during the virtual source image processing step S20.

The invention claimed is:

1. A method implemented by computer means of determining a correcting optical function to be applied on a virtual image to be displayed to a user of an optical system comprising at least:
   an optical lens designed to be placed in front of an eye of the user and comprising at least a back face having an optical design;
   a see-through displaying device designed and configured to display the virtual image towards the eye of the user, the virtual image being transmitted at least through the back face of the optical lens defining a display area on the back face;
   wherein the method comprises:
   an optical design data providing step, during which optical design data relating to the optical design of the back face of the optical lens are provided;
   a display area data providing step, during which display area data relative to at least one parameter of the display area are provided; and
   a correcting optical function determining step, during which a correcting optical function is determined based at least on the optical design data and on the display area data.

2. The method according to claim 1, wherein:
   the optical lens further comprises a front face opposed to the back face and having another optical design;
   the virtual image is further transmitted through the front face of the optical lens;
   during the optical design data providing step, optical design data relating to the optical design of the front face of the optical lens is further provided; and
   the correcting optical function is further determined based on the optical design data relating to the optical design of the front face of the optical lens.

3. The method according to claim 1, wherein the front and the back faces are designed and arranged so as to form an ophthalmic lens adapted to the user's prescription.

4. The method according to claim 3, wherein the ophthalmic lens is a progressive optical lens and/or a multifocal optical lens.

5. The method according to claim 1, wherein the at least one parameter of the display area comprises the relative position of the display area with respect to at least the back face and/or the relative angular extent of the display area with respect to at least the back face and/or the projection distance of the virtual image.

6. A method for providing an optical system adapted to a user, the optical system comprising at least an optical lens and a see-through displaying device, the method comprises at least:
   an optical lens providing step, during which the optical lens is provided, the optical lens being designed to be placed in front of an eye of the user and comprising at least a back face having an optical design;
   a see-through displaying device providing step; during which a see-through displaying device is provided, the see-through displaying device being designed and configured to display the virtual image towards the eye of the user, the virtual image being transmitted at least through the back face of the optical lens defining a display area on the back face;
   a correcting optical function determining step, during which a correcting optical function to be applied on a virtual image to be displayed to the user of the optical system is determined according to claim 1;
   an optical system adjusting step, during which the optical system is adjusted based on the determined correcting optical function.

7. The method according to claim 6, wherein the optical system adjusting step comprises an optical device providing step, during which an optical device is provided, the optical device being designed to be placed such that the virtual image is further transmitted through the optical device and the optical device having an optical function based on the determined correcting optical function.

8. The method according to claim 6, wherein the optical system adjusting step comprises a virtual source image processing step, during which a virtual source image from which the virtual image is displayed is processed based on the determined correcting optical function.

9. A correction determining component for determining a correcting optical function to be applied on a virtual image to be displayed to a user of an optical system comprising at least:
   an optical lens designed to be placed in front of an eye of the user and comprising at least a back face having an optical design;
   a see-through displaying device designed and configured to display the virtual image towards the eye of the user, the virtual image being transmitted at least through the back face of the optical lens defining a display area on the back face;
   the correction determining component comprising:
   a memory configured to store computer executable instructions, and a processor for executing the computer executable instructions stored in the memory, wherein the computer executable instructions comprise instructions for:
   providing optical design data relating to the optical design of the back face of the optical lens,
   providing display area data relative to at least one parameter of the display area, and
   determining a correcting optical function based at least on the optical design data and on the display area data.

10. The correction determining component according to claim 9, wherein the optical lens further comprises a front face opposed to the back face and having another optical design and the virtual image is further transmitted through the front face of the optical lens; and wherein the computer executable instructions further comprise one of the following instructions for:
    providing optical design data relating to the optical design of the front face of the optical lens, and determining the correcting optical function based on the optical design data relating to the optical design of the front face of the optical lens.

11. An optical system adapted to a user comprising:

an optical lens designed to be placed in front of an eye of the user and comprising at least a back face having an optical design;

a see-through displaying device designed and configured to display a virtual image towards the eye of the user, the virtual image being transmitted at least through the back face of the optical lens defining a display area on the back face;

a correction determining component configured to determine a correcting optical function to be applied on a virtual image to be displayed to a user by the see-through displaying device according to claim 1; and an optical system adjusting component configured to adjust the optical system based on the determined correcting optical function.

12. The optical system according to claim 11, wherein the optical system adjusting component comprises an optical device designed to be placed such that the virtual image is further transmitted through the optical device and the optical device having an optical function based on the determined correcting optical function.

13. The optical system according to claim 11, wherein the optical system adjusting component comprises:

a memory configured to store computer executable instructions, and a processor for executing the computer executable instructions stored in the memory, wherein the computer executable instructions comprise instructions for processing a virtual source image from which the virtual image is displayed, based on the determined correcting optical function.

14. A head mounted device configured to be worn by a user, comprising an optical system adapted to the user according to claim 11.

15. The method according to claim 7, wherein the optical function corresponds to a function providing for each gaze direction an effect of the optical lens on light ray passing through the optical lens.

16. The method according to claim 15, wherein the optical function is a dioptric function, a light absorption, a polarizing capability, or a reinforcement of contrast capacity.

17. The optical system according to claim 12, wherein the optical function corresponds to a function providing for each gaze direction an effect of the optical lens on light ray passing through the optical lens.

18. The optical system according to claim 17, wherein the optical function is a dioptric function, a light absorption, a polarizing capability, or a reinforcement of contrast capacity.

* * * * *